United States Patent [19]

Abe et al.

[11] Patent Number: 4,542,043
[45] Date of Patent: Sep. 17, 1985

[54] METHOD AND APPARATUS FOR CONTINUOUSLY COATING DISCRETE PARTICLES IN TURNING FLUIDIZED BED

[75] Inventors: Eiichi Abe; Hideharu Hirosue, both of Tosu, Japan

[73] Assignee: Agency of Industrial Science and Technology, Tokyo, Japan

[21] Appl. No.: 664,961

[22] Filed: Oct. 26, 1984

[30] Foreign Application Priority Data

Oct. 29, 1983 [JP] Japan ................................ 58-203542

[51] Int. Cl.⁴ ......................... B05D 1/22; B05C 19/02
[52] U.S. Cl. .................................... 427/213; 118/303; 118/DIG. 5
[58] Field of Search ..................... 427/6, 213; 118/303, 118/DIG. 5

[56] References Cited

U.S. PATENT DOCUMENTS

| 4,034,126 | 7/1977 | Funakoshi et al. | 427/213 X |
| 4,217,127 | 8/1980 | Kono | 427/213 X |
| 4,354,450 | 10/1982 | Nagahama et al. | 427/213 |

FOREIGN PATENT DOCUMENTS 55-4457  1/1980  Japan .................................... 118/303

*Primary Examiner*—Shrive P. Beck
*Attorney, Agent, or Firm*—Oblon, Fisher, Spivak, McClelland & Maier

[57] ABSTRACT

Method and apparatus for continuously coating discrete particles in a turning fluidized bed formed in a cylindrical coating vessel with a rotary disk at the bottom thereof by blowing hot air into the vessel through air blow holes located between the circumference of the disk and cylindrical side wall of the vessel while spraying a coating material into contact with the particles in the turning fluidized bed, characterized by introducing a particulate raw material and a coating material into the turning fluidized bed at constant feed rates; and discharging coated particles at the same rate as the feed rate of the particulate raw material through a particle discharge port located at such a height as to guarantee an average residence time corresponding to a desired coating rate under given operating conditions including the feed rate of the raw material, the rotational speed of the disk and the feed rate of hot air.

3 Claims, 5 Drawing Figures

METHOD AND APPARATUS FOR CONTINUOUSLY COATING DISCRETE PARTICLES IN TURNING FLUIDIZED BED

BACKGROUND OF THE INVENTION

1. Field of the Invention

This invention relates to a method and an apparatus for continuously coating particles in a turning fluidized bed, and more particularly to a method and an apparatus for continuously coating discrete solid particles in a turning fluidized bed formed in a cylindrical vessel or container the bottom of which is constituted by a rotary disk and into which hot air is blown through a number of air blow holes provided between the peripheral edge of the rotary disk and the side wall of the cylindrical vessel.

The techniques of coating discrete particles with a desired coating material are sorted to, for example, in the production of agricultural chemicals to impart porousness to carrier particle surfaces for increasing its capacity of retaining chemical components, in the pharmaceutical field to facilitate oral administration of doses, stabilize chemical components or adjust the point of producing a particular medicinal effect or effects, or in the manufacture of ceramic materials to improve the surface quality of particulate raw materials.

2. Description of the Prior Art

There have thus far been proposed various kinds of apparatus for coating discrete particles, among which the fluidised bed type coating apparatus are most widely adopted for their superiority in the ability of mixing particular raw material, uniformity of coated films and coating efficiency, so that batch type and continuously type coating apparatuses are put to practical use.

However, in the conventional fluidised bed coating processes, the particles are desired to have a particle size greater than 300 $\mu$m since otherwise they would tend to gather and make the coating operation difficult. Therefore, materials of smaller particle sizes are generally coated batchwise in a turning fluidised bed.

The batch type turning fluidised bed usually employs a cylindrical vessel which has a rotary disk at its bottom, and particles of a raw material are coated in a turning fluidised bed which is formed by blowing in hot air through gaps between the peripheral edge portions of the disk and cylindrical side walls of the vessel. This turning fluidised bed perimits to coat very fine particles without causing agglomeration of the particles, but it still involves a problem that the batchwise operation lacks efficiency. Accordingly, there has been a strong demand for the development of a continuous coating process which can be industrially applied for the production of coated particles even of the small particle sizes as mentioned above on a large scale.

SUMMARY OF THE INVENTION

It is therefore an object of the present invention to provide a method and an apparatus for continuously coating discrete particles even of small sizes in a turning fluidised bed which is formed in a cylindrical container with a rotary disk at the bottom of a particle coating vessel by blowing thereinto hot air from peripheral edge portions of the disk.

It is another object of the invention to provide a method and an apparatus which can coat discrete particles at a desired rate by arbitrarily setting the quantity of residential particles of the turning fluidised bed and their average residence time in the vessel through selection of suitable operating conditions including the feed rate of the particulate raw material, rotational speed of the disk and hot air blowing rate and a suitable height or heights of a particle discharge port or ports form the top surface of the disk.

In order to achieve the above-mentioned objectives, the present invention provides a method for continuously coating discrete particles in a turning fluidised bed formed in a cylindrical particle coating vessel having a rotary disk at the bottom thereof by blowing hot air into the vessel through air blow holes located between the circumference of the rotary disk and cylindrical side wall of the coating vessel while spraying a coating material into the vessel for contact with the particle in the turning fluidised bed, characterized in that the method comprises: introducing a particulate raw material and a coating material into the turning fluidised bed at predetermined constant feed rates; and discharging coated particles at the same rate as the feed rate of the particulate raw material through at least one particle discharge ports located such heights as to maintain an average residence time corresponding to a desired coating rate under given operating conditions including the feed rate of the particulate raw material, the rotational speed of the disk and the hot air blowing rate.

According to the invention, there is also provided an apparatus for carrying out the above-described method, comprising: a cylindrical coating vessel having at its bottom a rotary disk rotatable at a variable speed; means for blowing hot air into the coating vessel through air blow holes provided at the bottom of the vessel around the circumference of the rotary disk; raw material feed means for continuously feeding a particulate raw material at a controlled rate to a particle inlet provided in the side wall of the cylindrical vessel; means for spraying a coating material into the cylindrical coating vessel at a controlled rate; and a plural number of closable particle discharge ports provided in the side wall of the cylindrical vessel at different heights form the top surface of the rotary disk.

With the above-described method and apparatus according to the present invention, it becomes possible to carry out continuous coating of fine particles of grain sizes smaller than 300 $\mu$m, more specifically, continuous coating of fine particles with a grain size of at least 40 $\mu$m, which has been difficult with the ordinary fluidised bed coating apparatus.

After initiating the coating operation, the coated particles can be discharged from the container upon elapse of a time period two times longer than the average residence time of the particulate raw material, while maintaining a coating rate as obtained in the batchwise coating process.

The above and other objects, features and advantages of the invention will become apparent from the following description and appended claims, taken in conjunction with the accompanying drawings which show by way of example preferred embodiments of the invention and therefore should not be construed as being limitative of the invention.

DESCRIPTION OF PREFERRED EMBODIMENTS

Figure 1:
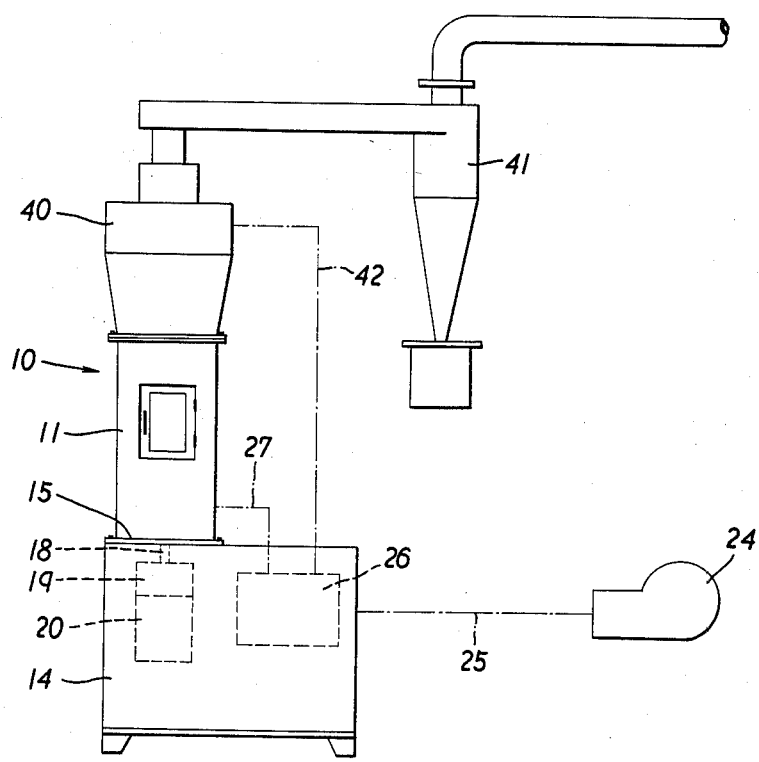
FIG. 1 is a schematic front view of a coating apparatus according to the invention.
Figure 2:
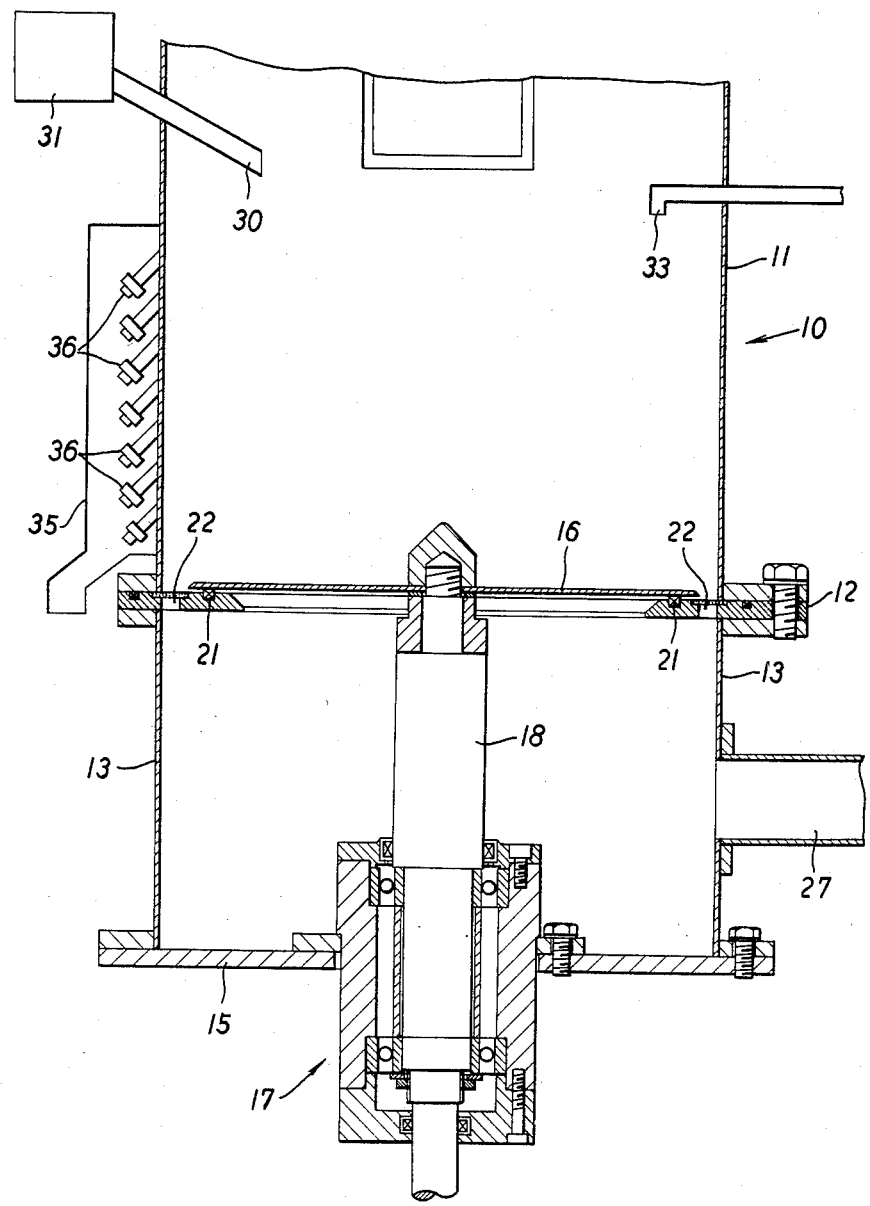
FIG. 2 is a schematic vertical section of the coating apparatus shown in FIG. 1.

Referring to FIGS. 1 and 2, there is illustrated an apparatus for continuously coating discrete solid particles in a fluidised bed according to the invention, wherein the reference numeral 10 denotes the coating apparatus as a whole, including a cylindrical container 11 and a cylindrical cover 13 which is connected to the lower end of the container 11 through an annular plate or ring 12 and fixed on a mount plate 15 on a base frame 14. The cylindrical container 11 interiorly defines a coating vessel the bottom of which is closed by a rotary disk 16 and mounted on a rotational shaft 18 which is in turn supported on the mounted plate 15 through a bearing 17. The lower end of the rotational shaft 18 is connected to a drive shaft of a motor 20 through a speed control unit 19.

The disk 16 is rotated with its peripheral edges placed on a slide piece 21 which is provided on the annular plate 12. If desired, the disk 16 may be mounted on the rotational shaft 18 through a spline joint which rotates the disk 16 integrally with the rotational shaft 18 while permitting the disk 16 to slide in the axial direction by gravity into sliding contact with the slide piece 21.

The annular plate or ring 12 which is located around the circumference of the disk 16 is provided with a multitude of hot air blow holes 22 opening between the circumference of the disk 16 and the side wall of the container 11 to blow thereinto hot air, which is sent by a blower 24 through conduit 25 and then to the hot air blow holes 22 through conduit 27 and cylindrical cover 13 after heating to a predetermined temperature through a temperature flow regulator 26 mounted on the base frame 14 and regulation of flow rate by a damper or the like.

Provided in upper portions of the cylindrical side wall of the container 11 are a particle inlet 30 which is connected to a feeder 31 for continuously feeding the particulate raw material at a controlled rate, and a spray nozzle 33 which sprays a coating material into the peripheral portions of the coating chamber at an adjustable rate. Further, the container 11 is provided with a plural number of coated particle outlets 36 at different heights from the disk 16 and connected to a particle discharge duct 35 for continuously discharging coated particles therethrough.

Figure 3:
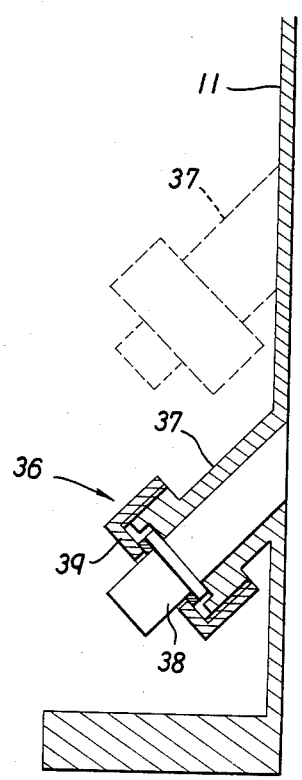
FIG. 3 is an enlarged sectional view showing major components of the coating apparatus.

The particle outlets 36 may be arranged in the manner as exemplified in FIG. 3, namely, may be constituted by a number of discharge pipes 37 which are mounted at different heights and in downwardly inclined state within the discharge duct 35 on the outer side of the cylindrical container 11 which defines the coating vessel. Except for the ones at required heights, the discharge pipes 37 are closed by blind plugs 38 which have inner end faces conforming with the shape of the inner wall surface of the cylindrical container. The blind plug or plugs 38 which are inserted in the unnecessary discharge pipes are fixed in position by screw caps 39.

The coating vessel 10 of the fluidised bed continuous coating apparatus of FIG. 1 is connected at its upper end to a cyclone 40 which is in turn connected to a cyclone 41 of a second stage, so that air is supplied to the cyclone 40 through a temperature flow regulator 26 and conduit 42 to enhance its particle collecting efficiency.

In order to carry out the method of the invention by the use of the above-described apparatus, the disk 16 is put in rotation while hot air which is sent in by the blower 24 through hot air conduit 27 is blown into the coating vessel through the air blow holes 22 which are provided around the circumference of the disk 16. In the next place, particulate raw material is continuously fed into the cylindrical container 10 by the continuous feeder 31 through the feed port 30, while discharging particles through selected open discharge ports 36 leading to the discharge duct 35. Simultaneously, a coating material is continuously sprayed through the spray nozzle 33 and contacted the particles for coating same.

Figure 4:
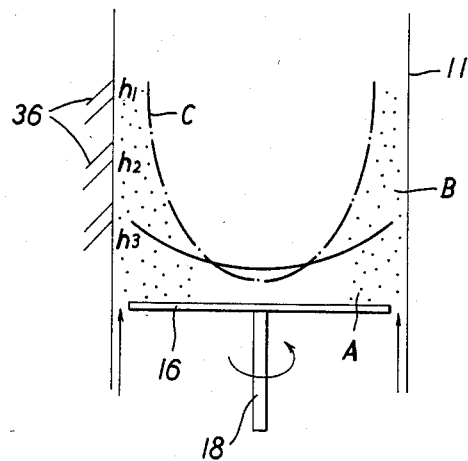
FIG. 4 is a schematic illustration employed for the explanation of the operation by the coating apparatus.

The rotational speed of the disk and the feed rate of hot air are selected such that a turning fluidised bed is formed in the cylindrical container 11. The particles in the turning fluidised bed show behaviors which are completely different from those in an ordinary fluidised bed. More particularly, the particles in the turning fluidised bed which are turned on the rotary disk are thrown toward the inner peripheral wall of the vessel under the influence of the centrifugal force, and in this state they are fluidized only in the regions in the vicinity of the inner peripheral wall by hot air blown in from the circumference of the rotary disk as schematically shown in FIG. 4 in which the reference characters A and B denote whirling and fluidised regions of the particles, respectively. In this turning fluidised state, the particulate raw material predominates in the peripheral regions or in the regions close to the inner peripheral wall of the vessel, so that the particles are of course discharged at a higher speed through a lower one of the discharge ports 36 which are located at different heights, for example, at $h_1$, $h_2$ and $h_3$. In the continuous coating process, the particle feed rate and the coated particle discharge rate are equalised to maintain a constant quantity of residential particles in the vessel, and the average residence time becomes shorter where a particle discharge port is located at a lower height.

Accordingly, the average residence time can be adjusted not only by selecting suitable heights h of the discharge ports but also by varying the hot air feed rate and the rotational speed of the disk.

The temperature of hot air is suitably selected according to the kind of the coating material to be used, while the feed rate of the raw particulate material is selected in relation with other conditions to guarantee a suitable residence time of the particles in the cylindrical container. Further, the spraying rate of the coating material is selected suitably depending upon the kind and the desired thickness of the coating film. The just-mentioned conditions impose the following influences on the fluidised bed. Strictly speaking, the individual discrete particles which are discharged in a continuous coating operation have a residence time ranging from zero to infinity, and undergo coating at different rates which are distributed over a range corresponding to the residence time distribution. Namely, an increase and a reduction in the average residence time are reflected by an increase and reduction in the average coating rate, respectively. In addition, upon increasing the rotational speed of the disk in the coating vessel which holds a given amount of discrete particles, a greater centrifugal force acts on the individual particles and urges them toward the inner periphery of the vessel as indicated by a chain line C in FIG. 4. It follows that the particle discharging speed through a discharge port at a given height is increased as the rotational speed is raised.

On the other hand, an increase of the amount of hot air causes the fluidised bed to expand to a greater height (increasing the distances between the individual particles), producing the same effect on the particle discharging speed as the increase of the rotational speed of the disk.

Further, a higher feed rate of the particulate raw material will increase the quantity of residential particles in the fluidised bed but it is only in a degree smaller than the increase of the feed rate so that the average residence time becomes shorter.

The invention is illustrated more particularly by the following examples.

EXPERIMENTAL EXAMPLE

Continuous feed and discharge of particulate material, silica sand having a grain size of 73-149 μm, were tested by the use a turning fluidised bed type continuous coating apparatus with a cylindrical container of the construction as shown in FIG. 2 and of 25 cm in inside diameter.

As a result, it has been ascertained that the average residence time $\bar{\theta}$ (min.) of the raw material particles is related with the rotational speed N (r.p.m.) of the disk, the hot air feed rate Q (m³/hr), the residential particle content H (g) and the height h (mm) of the particle discharge port, as expressed by the following equation.

$$\bar{\theta} = H/F = 7.2 \times 10^5 = \frac{h^3}{Q^{2.5}H^{0.5}N^2}$$

wherein F is the feed rate (g/min) of the raw material particles, and the experiments covered the ranges of h=47 to 127 mm, Q=26 to 64 m³/hr, H=600 to 2400 g, N=90 to 120 r.p.m.

The average residence time can be set arbitrarily by varying the operating conditions in this manner.

EXAMPLE

There were employed a particulate raw material consisting of silica sand of 73-149 μm in grain size and a coating material consisting of an aqueous slurry of agalmatolite, coating the surfaces of silica sand with agalmatolite of 4 μm in particle size by the use of a turning fluidised bed type continuous coating apparatus with a cylindrical container of the construction as shown in FIG. 1 and of 25 cm in inside diameter.

The coating operation was carried out under the following conditions: a residential amount of 600 g.; a particulate raw material feed rate of 15 g/min; an average residence time of 40 min.; an agalmatolite feed rate of 5.2 g/min; a rotary disk speed of 91 r.p.m.; a hot air feed rate 64 m³/hr; a hot air temperature of 53° C.; and a discharge port height of 87 mm from the disk surface.

Figure 5:
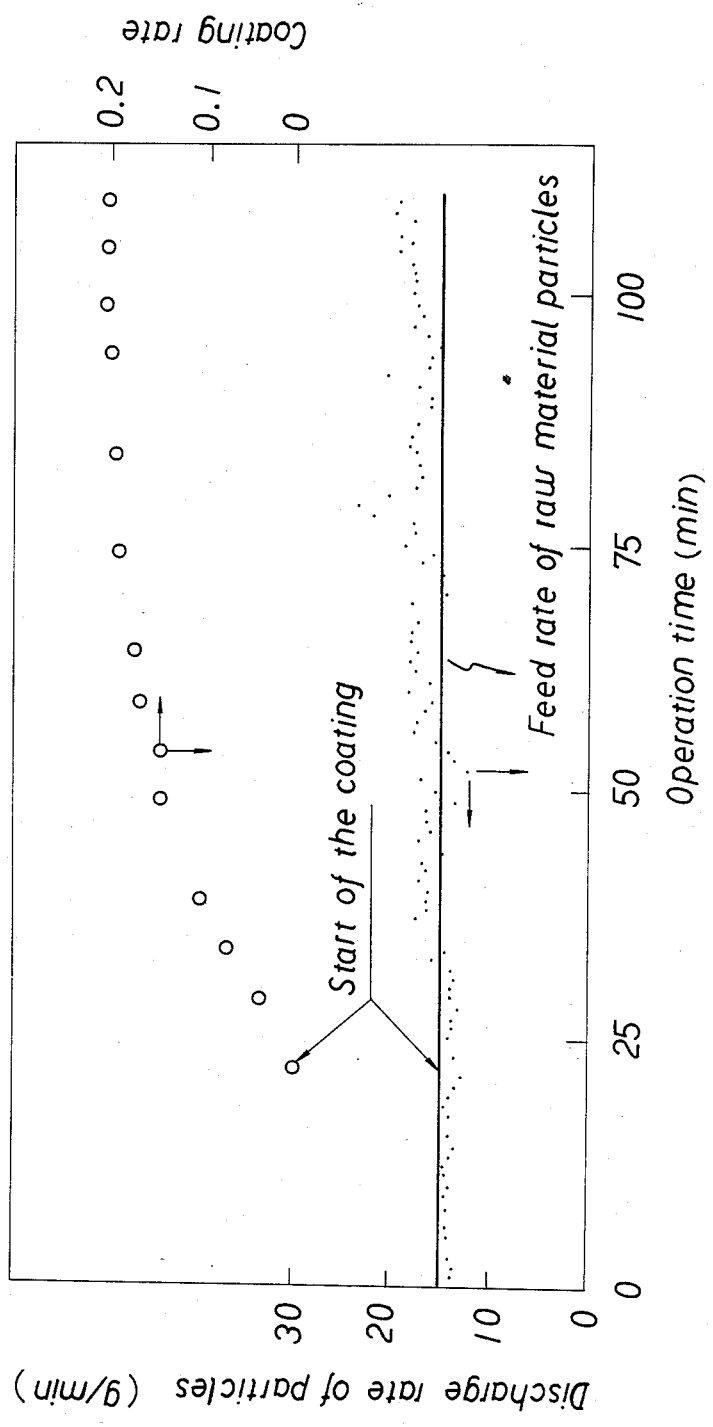
FIG. 5 is a diagram showing the relationship of the operating time with the particle discharge rate and coating rate in the continuous coating method according to the present invention.

FIG. 5 shows the relationship of the operating time with the particle discharge rate and the coating rate. In this figure, the initial period of 0-22 minutes of the operating time is a stage which precedes the spraying of the coating material, indicating realisation of an almost perfect continuous operation in which the particle feed and discharge rates are equalised with each other.

It will also be seen from FIG. 5 that the coating rate (the mass of deposited agalmatolite per unit mass of the raw material particles) reaches a saturated value within a coating time which is about double the average residence time and keeps the same value thereafter. This indicates that the continuous coating operation is performed smoothly. It has been ascertained that this coating rate is equivalent to the rate which is attained by a 40 minutes coating operation in the case of a batchwise operation.

Upon lapse of the coating time, the particle discharge rate becomes gradually greater than the particle feed rate and the difference between the particle feed and discharge rate represents the amount of agalmatolite which is coated on the raw material particles.

What is claimed is:

1. A method of continuously coating discrete particles in a turning fluidised bed formed in a cylindrical coating vessel with a rotary disk at the bottom thereof by blowing hot air into the vessel through air blow holes located between the circumference of said disk and cylindrical side wall of said vessel while spraying a coating material into said vessel for contact with the discrete particles in the turning fluidised bed, characterized in that said method comprises:
   introducing a particulate raw material and a coating material into said turning fluidised bed at constant feed rates and
   discharging coated particles at the same rate as said feed rate of said particulate raw material through at least a particle discharge port located at such a height as to guarantee an average residence time corresponding to a desired coating rate under given operating conditions including the feed rate of said raw material, the rotational speed of said disk and the feed rate of hot air.

2. The method as set forth in claim 1, wherein said cylindrical vessel is provided with a plural number of particle discharge ports located at different heights from the top surface of said rotary disk and adapted to be opened selectively.

3. An apparatus for continuously coating discrete particles in a turning fluidised bed, comprising in combination:
   a cylindrical vessel having at the bottom thereof a rotary disk rotatable at a variable speed;
   means for blowing hot air into said vessel through air blow holes provided at the bottom of said vessel around the circumference of said rotary disk;
   raw material feed means for continuously feeding a particulate raw material at a controlled rate to a particle inlet provided in the side wall of said cylindrical vessel;
   means for spraying a coating material into said cylindrical vessel at a controlled rate; and
   a plural number of closable particle discharge ports provided in the side wall of said cylindrical vessel at different height from the top surface of said rotary disk.

* * * * *

UNITED STATES PATENT AND TRADEMARK OFFICE
CERTIFICATE OF CORRECTION

PATENT NO. : 4,542,043
DATED : September 17, 1985
INVENTOR(S) : Eiichi Abe et al It is certified that error appears in the above-identified patent and that said Letters Patent is hereby corrected as shown below:

Column 2, line 44, please change "form" to --from--.

Column 5, line 45 (in the equation), after "$10^5$" delete "=".

Signed and Sealed this

Third Day of June 1986

[SEAL]

Attest:

DONALD J. QUIGG

Attesting Officer

Commissioner of Patents and Trademarks